Sept. 5, 1950  H. M. CLARK  2,521,503
COUPLING MEANS FOR TRACTORS
Filed July 9, 1945  2 Sheets-Sheet 1
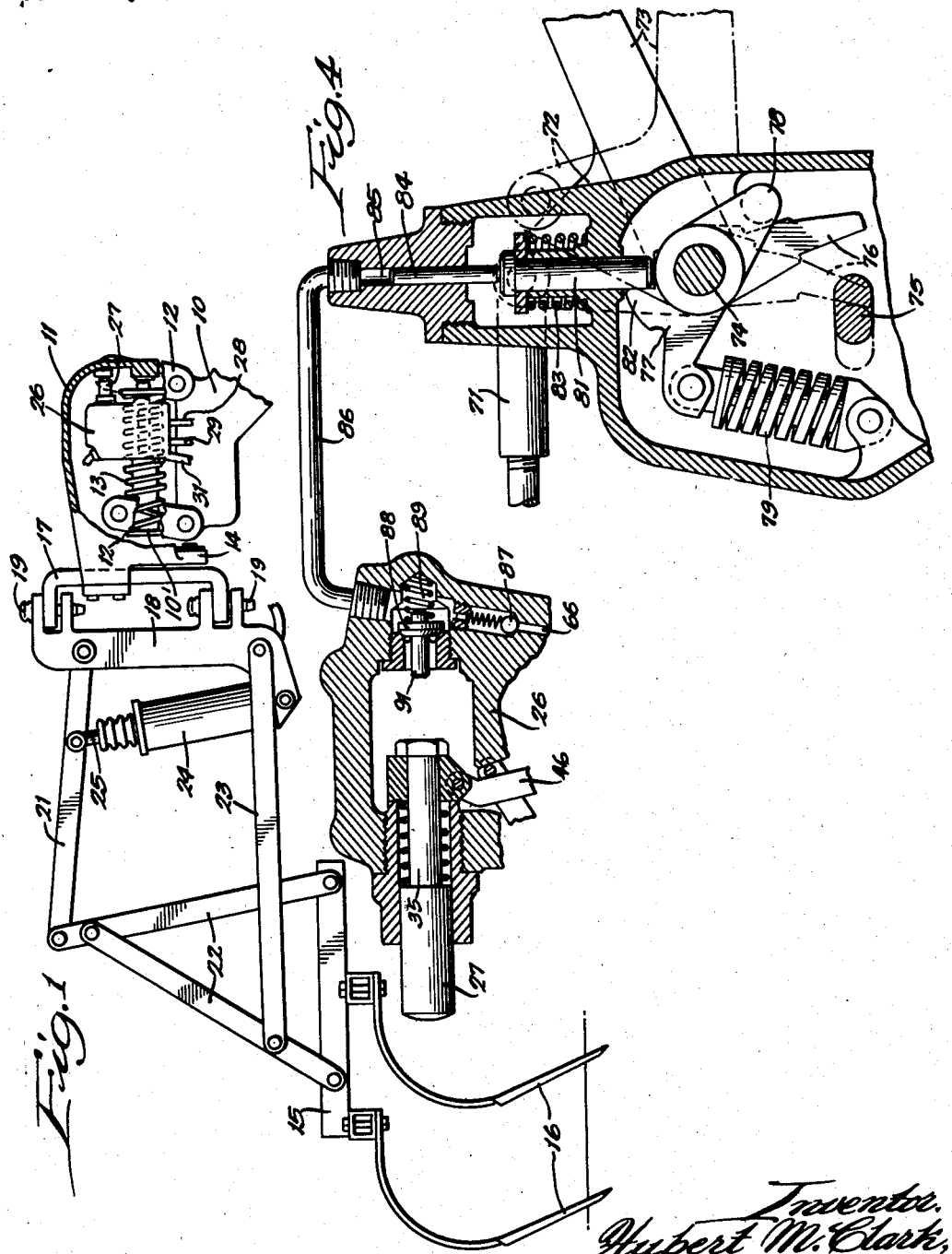
Inventor.
Hubert M. Clark,
By Dawson, Ooms and Booth,
Attorneys.

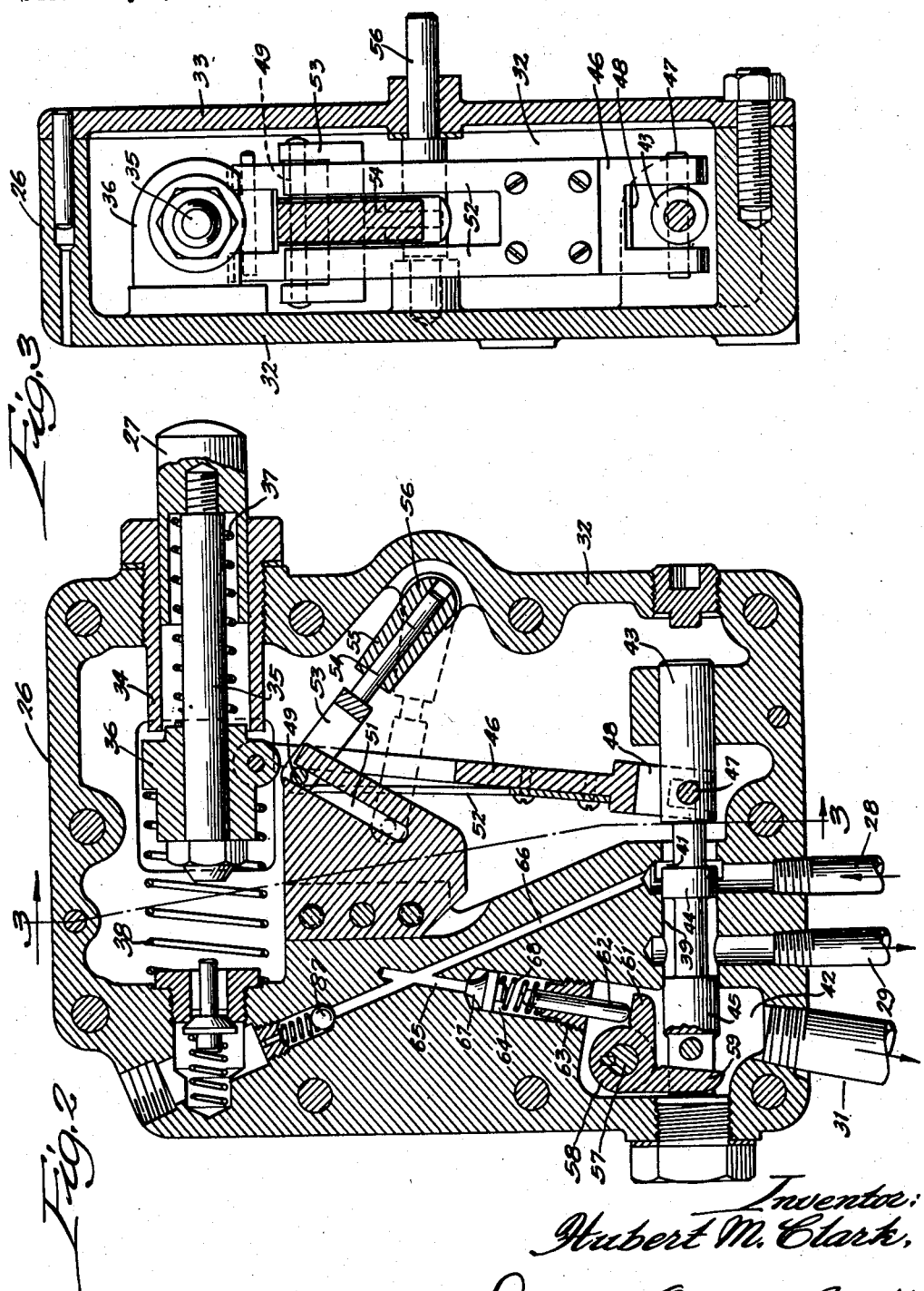

Patented Sept. 5, 1950

2,521,503

UNITED STATES PATENT OFFICE 2,521,503

COUPLING MEANS FOR TRACTORS

Hubert M. Clark, Detroit, Mich., assignor to George B. Sherman, trustee, assignor to Sherman Industries, Inc., a corporation of Delaware Application July 9, 1945, Serial No. 603,858

12 Claims. (Cl. 97—50)

This invention relates to coupling means for tractors and more particularly to means for automatically controlling the depth of an implement drawn by the tractor.

One of the objects of the invention is to provide coupling means for tractors in which the depth of an implement drawn by the tractor is controlled automatically in response to the tractive load.

Another object is to provide a coupling means in which the automatic control can be overcome manually when it is desired to elevate the implement or to place it in inoperative position. In one desirable construction the implement is controlled hydraulically and the hydraulic pressure opposes the manual means after a predetermined pressure has been reached to prevent damage to the mechanism.

Another object is to provide a coupling means in which the control is easily and quickly adjusted to vary the depth at which the implement is maintained thereby.

Still another object is to provide a coupling means in which the depth of the implement may be adjusted by moving a pivot in a mechanical control linkage.

A still further object is to provide a coupling means in which the tractor is automatically stopped by disengaging its clutch or applying its brake, or both, under excessive load conditions. According to one feature of the invention, actuating means are provided to disengage the clutch or engage the brake, or both, which is normally latched in inoperative position and is released under excessive load conditions.

The above and other objects and advantages of the invention will be more readily apparent from the following description when read in connection with the accompanying drawing, in which—

Figure 1 is a partial side elevation with parts in section of a coupling means embodying the invention illustrating a portion of the tractor by which it is carried;

Figure 2 is an enlarged sectional view of the central unit of Figure 1;

Figure 3 is a section on the line 3—3 of Figure 2; and

Figure 4 is a partial diagrammatic section illustrating the clutch and brake operating mechanism.

As shown in Figure 1, the coupling means of the invention is adapted to be carried by a tractor of any desired construction, a portion of which adjacent the rear end of the tractor is indicated at 10. It will be understood that the tractor is of substantially conventional construction including the usual driving engine, driving wheels and control mechanisms, such as the clutch and brake and steering mechanism. Any desired type of tractor such as would be suitable for normal agricultural use may be employed.

The coupling means of the invention comprises a head 11 which is mounted on the tractor part 10 for movement lengthwise of the tractor. As shown, the head 11 is supported on generally vertical links 12 pivoted at their lower ends to the tractor part 10 and at their upper end to the head so that the head can move horizontally on the tractor but cannot tilt or move vertically. The head is urged forward on the tractor by one or more springs 13 engaging the head and suitable brackets 10' on the tractor part 10, a stop indicated at 14 being provided to limit forward movement of the head on the tractor.

The head is adapted to draw any suitable type of ground engaging implement, the implement illustrated being of the cultivator type, including a frame 15 carrying a series of cultivator plow blades 16. The frame 15 is connected to the head 11 by means shown as comprising a bracket 17 on the head to which a forward frame member 18 is connected by pins 19. An upper link 21 is pivoted at one end to the frame member 18 and at its opposite end to an upwardly extending framework 22 on the frame 15. One or more lower links 23 are similarly pivoted at their forward ends to the frame member 18 and at their rearward ends to the framework 22. The construction, as so far illustrated, may be substantially similar to that more particularly described and claimed in my co-pending application, Serial No. 565,229, filed November 27, 1944. The links 21 and 23 are adapted to be turned to raise and lower the plow blades 16 to vary their depth in the ground by means of a motor illustrated as a cylinder 24 connected to the frame member 18 and having a piston therein whose piston rod 25 is pivoted to the upper link 21. When fluid is pumped into the cylinder 24 below the piston, the links 21 and 23 will be elevated to reduce the depth of the plow blades in the ground while when fluid is withdrawn from the cylinder, the plow blades will sink deeper into the ground under the weight of the blades and associated mechanism and their normal suck. It will be understood that the specific mechanism shown for controlling the depth of the implement in the ground is illustrative only and that various other types of controls or connections might be used with different types of implements in accordance with the present invention.

Supply of fluid to and exhaust of fluid from the cylinder 24 is controlled by a control unit indicated generally at 26. The control unit, as shown, is mounted on the tractor part 10 within the hollow head 11 and is formed with a forwardly projecting plunger 27, engageable with the forward end of the head, to be forced into the control unit as the head moves rearwardly on the tractor. The control unit is supplied with fluid from a pump or the like mounted on the tractor through a conduit indicated in part at 28 and is connected to the cylinder 24 through a similar conduit 29. A drain conduit 31 connected to the unit returns excess fluid therefrom to a sump or the like from which the pump is supplied.

The control unit is illustrated more particularly in Figures 2 and 3 as including a main casing part 32 which, as illustrated, may be a casting open on one side and closed by a detachable cover plate 33. The plunger 27 is slidable in a sleeve 34 shown as screw threaded in the casting 32. A stem 35 is secured to the plunger 27 at one end and projects slidably through a collar 36 which is urged away from the plunger by a spring 37. A second spring 38 engages the collar 36 to urge it toward the plunger and normally acts through the spring 37 to urge the plunger outwardly of the control unit.

To control the motor 24 control means are provided in the control unit movable to one position to supply liquid to the motor to raise the linkage and to another position to vent liquid from the motor to lower the linkage. This control means includes the valve structure now to be described.

In the lower end of the casting 32 there is provided a valve bore 39 communicating with the pump conduit 28, the outlet conduit 29 to the motor and the drain conduit 31. As shown, the pump conduit 28 communicates with an enlargement 41 of the bore and the drain conduit 31 communicates with an enlarged drain chamber 42. In the construction shown the drain chamber 42 is in communication with the hollow interior of the unit casing inside of the cover plate 33 so that all liquid discharged into the casing will eventually be returned to the pump through the drain conduit.

A control valve plunger comprising a movable part of the control means is slidable in the bore 39 and comprises an elongated stem 43 having spaced abutments 44 and 45 thereon.

The valve is controlled in response to the tractive load on the head 11 through the plunger 27. For this purpose, the valve stem 43 is connected to the plunger 27 through a lever 46 which is pivoted at its upper end to the collar 36 and which is operatively connected to the valve stem 43 through a pin 47 carried by the valve stem and fitting between yoked end portions 48 on the lever. Intermediate its ends the lever engages a pivot or fulcrum pin 49 which is slidable in a slot 51 formed in a detachable web in the casting 32 and lying at an acute angle to the length of the lever. With this construction, when the plunger 27 tends to move to the left, as seen in Figure 2, it will move the valve stem 43 to the right. Conversely when the plunger and collar 36 are moved to the right by the spring 38, the lever will turn about the pivot 49 to move the valve stem to the left. The plunger 27 thus constitutes a means operatively connecting the lever 46 to the head 11 to be moved thereby. In order to hold the lever in yielding contact with the pivot pin 49 during this latter operation, a leaf spring 52 is secured to the lever 46 and engages the pin 49 on the side thereof opposite that engaged by the lever 46.

With the valve in the position shown in Figure 2, the enlargements 44 and 45 close the bore 39 on opposite sides of the conduit 29 so that fluid in the cylinder 24 is trapped and the linkage carrying the implement is held in substantially fixed position. Upon an increase of the tractive load of the implement, the head 11 will be moved to the left to move the plunger 27 to the left thereby through the lever 46 to move the valve 43 to the right. After a predetermined amount of travel of the valve, the enlargement 44 will pass the connection to the conduit 28 closing the right end of the bore 39 by engagement in the bore 39 immediately to the right of the enlarged portion 41 and connecting the conduits 28 and 29. At this time, fluid will be pumped from the conduit 28 through the valve and the conduit 29 into the cylinder 24 to elevate the link 21 and decrease the depth of the implement in the ground. As the implement depth decreases, the tractive load on the head 11 decreases so that it will move to the right permitting the plunger 27 to move to the right and allowing the spring 38 to return the valve to the neutral position shown in Figure 2. Upon a decrease in the tractive load, the head 11 and plunger 27 will move further to the right causing the valve 43 to move to the left to open the conduit 29 into the drain chamber 42. At this time, fluid will flow out of the cylinder 24 allowing the linkage and the implement to drop so that the depth of the implement in the ground will be increased. As the implement depth increases, the tractive load increases to move the head 11 and plunger 27 to the left to return the valve to its neutral position.

In order to vary the setting of the control unit, thereby to vary the depth at which the implement will be maintained, means are provided for shifting and which are controllable to shift, the pivot pin 49 in the guide slot 51 to vary its point of engagement with the lever 46. As shown, this means comprises a yoke 53 which carries the pin 49 and which is supported by a rod 54 slidably mounted in an arm 55 carried by a shaft 56. The shaft 56 projects through the cover plate 33 to be accessible from the exterior of the control unit and may carry any desired type of operating handle by which it can be turned at will to shift the pivot pin. As the pivot pin is shifted downwardly in the slot 51 it varies the relative length of the lever parts on opposite sides of the pivot and at the same time tends to move away from the lever 46. Therefore, in order to move the valve to its neutral position the plunger 27 must necessarily move further to the left as the pivot pin 49 is moved down. A greater tractive load on the head 11 is thus required to bring the mechanism back to neutral as the pivot pin is moved down. By this very simple mechanism, the depth setting of the implement or the tractive load to which the control will respond can easily and quickly be adjusted.

In order to permit raising of the implement or otherwise making it ineffective for turning at the end of a row or the like, a manual means is provided to move the valve. As shown, the manual means comprises a shaft 57 journalled in the casing and carrying a sleeve 58 from which arms 59 and 61 project. The arm 59 normally lies opposite the end of the valve stem 43 so that when the shaft 57 is turned counterclockwise as seen in Figure 2 the valve stem will be shifted to the right to connect the conduits 28 and 29. Thus by turning the shaft 57, the operator can elevate the instrument to an inoperative position at will for carrying the implement on the tractor.

The arm 61 engages the lower end of a plunger 62 which is slidable through a bushing 63 in the lower end of a bore 64. The upper end of the bore 64 is connected to a reduced bore 65 which is in turn connected through a bore 66 to the upper end of the conduit 28. A plunger 67 is slidable in the bore 64 and is normally urged upwardly therein by a spring 68. The plunger 67 is formed with a reduced upper end, as shown, adapted to close the bore 65.

When the valve is shifted to the right by turning the shaft 57 as described above, the bore 66 will be opened to the bore 39 between the conduits 28 and 29 so that the same pressure will exist in the bore as in the motor cylinder 24. Should this pressure increase to a value at which it will unseat the plunger 67 from the bore 65 against the spring 68, the plunger will start to move down in the bore 64. After its initial movement the full area of the plunger across the full cross section 64 is exposed to the pressure so that the plunger will move down rapidly into engagement with the rod 62 to urge it downwardly. This tends to turn the sleeve 58 clockwise to move the arm 59 away from the valve stem so that it can return to the neutral position shown in Figure 2 and constitutes a means responsive to the pressure supplied to the motor to oppose the manual valve operating means when the pressure exceeds the amount required to unseat the plunger 67 from the bore 65. It will be noted that during manual movement of the valve stem to the right, the leaf spring 52 will yield so that the valve can be moved without moving the plunger 27 or the collar 36.

According to one feature of the invention an excessive tractive load will produce either or both a disengagement of the tractor clutch or an engagement of the tractor brake. For this purpose, a mechanism, as shown in Figure 4, is provided. In this construction, the clutch is controlled by a link 71 connected to an arm 72 on a manual clutch operating lever 73 which is pivoted on a shaft 74. The lever 73 may be connected to the usual clutch pedal for movement by the operator from the full line to the dotted line position shown to disengage the clutch. The brakes on the tractor may be controlled separately from the clutch but are preferably operated through a lever 75 which is adapted to be engaged by an arm 76 projecting from the clutch lever 73 during the last part of the downward travel thereof. With this construction, a single pedal on the tractor may be employed which operates during the first part of its movement to disengage the clutch and during the last part of its movement to engage the brake.

In order automatically to operate the clutch and brake under excess tractive load conditions, an actuating member 77 is pivoted on the shaft 74 and carries a pin 78 which is engageable with the arm 76. The actuating member is urged in a clockwise direction by a relatively strong spring 79 and is normally held against clockwise rotation by a latch pin 81 engaging a latch shoulder 82 on the actuating member. The latch pin 81 is urged away from the shoulder 82 by a spring 83 and is normally held in engagement with the shoulder by a pressure responsive plunger 84 slidable in a bore 85. The bore 85 is connected by a conduit 86 to the passage 66 in the control unit, a check valve 87 being provided to prevent back flow from the conduit 86 into the passage 66. When the passage 66 is supplied with fluid under pressure during the times the valve stem 43 is shifted to the right, the pressure will flow through the conduit 86 and press the plunger 84 downwardly to urge the latch plunger 81 down against the spring 83 to the position shown in Figure 4. When pressure on the passage 66 is relieved, the plunger 84 will be held in its downward position due to trapping of fluid in the bore 85 by the check valve 87. Thus this mechanism constitutes a means controlled by the pressure in the supply connection to the valve normally to maintain the tractor clutch and brake in operative condition for normal manual control.

To release the latch plunger 81 under conditions of excessive load, a dump valve 88 is provided connected to the conduit 86 above the check valve 87. The valve 88 is normally held closed by a spring 89 and carries a plunger 91 adapted to be engaged by the inner end of the rod 35 to be opened thereby. With this construction, if the draft should rise to a value sufficient to move the plunger 27 completely into the control unit casing, the inner end of the rod 35 will engage the plunger 91 to open the dump valve 88. Thus the plunger 27 also forms a means connecting the dump valve 88 to the head 11. It will be appreciated that this condition will not occur during normal operation but only in the event of an abnormal condition such as the implement's striking a root, a heavy boulder or the like. When the valve 88 is opened, pressure in the bore 85 will be vented, allowing the spring 83 to raise the plunger 84 and the latch plunger 81. When the latch plunger 81 disengages the shoulder 82, the spring 79 will turn the actuating member 77 clockwise causing the pin 78 to engage the arm 76. The spring acting through the pin and the arm 76 will turn the lever 73 clockwise, first to disengage the clutch and then to apply the tractor brake. Thus any damage to the tractor or to the implement which might be caused by excessive load is prevented.

While one embodiment of the invention has been shown and described in detail, it will be understood that this is illustrative only and is not to be taken as a definition of the scope of the invention, reference being had for this purpose to the appended claims.

What is claimed is:

1. In a coupling means for a tractor, a head mounted on the tractor for movement lengthwise thereof, linkage carried solely by the head to carry a ground engaging implement, a motor connected to the implement to control its depth relative to the ground, a control valve for the motor including a part movable to one position to raise the linkage and to another position to lower the linkage, a lever, a shiftable pivot for the lever on the tractor adjacent the head, the lever engaging the movable part to move it, means operatively connecting the lever to the head to be moved thereby as the head moves lengthwise on the tractor in response to changes in the implement draft, and means for shifting the pivot of the lever.

2. In a coupling means for a tractor, a head mounted on the tractor for movement lengthwise thereof, upper and lower generally parallel links carried by the head to carry a ground engaging implement, a motor connected to the implement to control its depth relative to the ground, a control valve for the motor including a part movable to one position to raise the linkage and to another position to lower the linkage, a lever connected at one end to the movable part to move it, means operatively connecting the other end of the lever to the head to be moved thereby, a fulcrum member slidably engaging the lever intermediate its ends to change the effective leverage thereof, and means controllable at will to shift the fulcrum member.

3. In a coupling means for a tractor, a head mounted on the tractor for movement lengthwise thereof, linkage carried by the head to carry a ground engaging implement, a motor connected to the implement to control its depth relative to the ground, a control valve for the motor including a part movable to one position to raise the linkage and to another position to lower the linkage, a lever connected at one end to the movable part to move it, means operatively connecting the other end of the lever to the head to be moved thereby, a fulcrum member slidably engaging the lever intermediate its ends to change the effective leverage thereof, a track movably to support the fulcrum member and to define a path of movement thereof, and means to shift the fulcrum member along the track.

4. In a coupling means for a tractor, a head mounted on the tractor for movement lengthwise thereof, linkage carried by the head to carry a ground engaging implement, a hydraulic motor connected to the implement to control its depth relative to the ground, a shiftable control valve controlling the motor, the valve having a supply connection for supply of fluid under pressure thereto, a clutch disengaging member on the tractor, a latch responsive to fluid supplied from the supply connection to hold the clutch disengaging member in inoperative position, a dump valve adapted when open to relieve fluid pressure on the latch whereby it will release the clutch disengaging manner, mechanism connecting the head to the control valve, and a part on said mechanism engageable with the dump valve to open it when the head is moved to its extreme position in one direction.

5. In a coupling means for a tractor, a head mounted on the tractor for movement lengthwise thereof, linkage carried by the head to carry a ground engaging implement, a hydraulic motor connected to the implement to control its depth relative to the ground, a shiftable control valve controlling the motor, the valve having a supply connection for supply of fluid under pressure thereto, a clutch disengaging member on the tractor, a latch responsive to fluid supplied from the supply connection to hold the clutch disengaging member in inoperative position, a check valve to maintain fluid pressure on the latch, a dump valve to relieve fluid pressure on the latch whereby it will release the clutch disengaging member, mechanism connecting the head to the control valve, and a part on said mechanism engageable with the dump valve to open it when the head is moved to its extreme position in one direction.

6. In a coupling means for a tractor, a head mounted on the tractor for movement lengthwise thereof, linkage carried by the head to carry a ground engaging implement, a hydraulic motor connected to the implement to control its depth relative to the ground, a shiftable control valve controlling the motor, the valve having a supply connection for supply of fluid under pressure thereto, a clutch disengaging member on the tractor, a latch responsive to fluid supplied from the supply connection to hold the clutch disengaging member in inoperative position, a check valve to maintain fluid pressure on the latch, a dump valve to relieve fluid pressure on the latch whereby it will release the clutch disengaging member, a plunger engaging the head to be moved thereby and engageable with the dump valve to open it when the plunger is moved to its extreme position in one direction, and means connecting the plunger to the control valve to operate it.

7. In a coupling means for a tractor, a head mounted on the tractor for movement lengthwise thereof, linkage carried by the head to carry a ground engaging implement, a hydraulic motor connected to the implement to control its depth relative to the ground, a shiftable control valve controlling the motor, the valve having a supply connection for supply of fluid under pressure thereto, a clutch disengaging member on the tractor, a latch responsive to fluid supplied from the supply connection to hold the clutch disengaging member in inoperative position, a check valve to maintain fluid pressure on the latch, a dump valve to relieve fluid pressure on the latch whereby it will release the clutch disengaging member, a plunger engaging the head to be moved thereby and engageable with the dump valve to open it when the plunger is moved to its extreme position in one direction, a lever connected at its opposite ends to the plunger and the control valve, and a shiftable fulcrum engageable with the lever intermediate its ends.

8. In a coupling means for a tractor, a head mounted on the tractor for movement lengthwise thereof, linkage carried solely by the head to carry a ground engaging implement, a hydraulic motor connected to the implement to control its depth relative to the ground, a shiftable control valve controlling the motor, the valve having a supply connection for supply of fluid under pressure thereto, a plunger engaging the head to be moved thereby, means connecting the plunger to the control valve to move it, a manually operated member engageable with the control valve to move the control valve to a position to raise the implement, and a fluid pressure responsive element responsive to the pressure supplied to the motor to oppose the manually operated member when the pressure exceeds a predetermined value.

9. In a coupling means for a tractor, a head mounted on the tractor for movement lengthwise thereof, linkage carried by the head to carry a ground engaging implement, a hydraulic motor connected to the implement to control its depth relative to the ground, a shiftable control valve controlling the motor, the valve having a supply connection for supply of fluid under pressure thereto, a plunger engaging the head to be moved thereby, means connecting the plunger to the control valve to move it, a manually operable member engageable with the control valve to move the control valve to a position to raise the implement, and a second plunger having portions of different diameters responsive to the pressure supplied to the motor to oppose the manual means, the smaller diameter portion only of the second plunger being initially effective and the larger diameter portion being effective after initial movement of the plunger.

10. In a coupling means for a tractor, a head mounted on the tractor for movement lengthwise thereof, a spring engaging the head urging it forward on the tractor, linkage carried by the head to carry a ground engaging implement, a hydraulic motor connected to the implement to control its depth relative to the ground, and a control unit for the motor mounted adjacent the head, the control unit including a casing, a valve in the casing controlling the supply of actuating fluid to the motor, a plunger in the casing engaging the head to be moved thereby, a lever pivotally connected at spaced points to the valve and the plunger, and a fulcrum member movably mounted in the casing to be engaged by the lever at different points in the lever length.

11. In a coupling means for a tractor, a head mounted on the tractor for movement lengthwise thereof, a spring engaging the head urging it forward on the tractor, linkage carried by the head to carry a ground engaging implement, a hydraulic motor connected to the implement to control its depth relative to the ground, and a control unit for the motor mounted adjacent the head, the control unit including a casing, a valve in the casing controlling the supply of actuating fluid to the motor, a plunger in the casing engaging the head to be moved thereby, a lever pivotally connected at spaced points to the valve and the plunger, a fulcrum member slidably supported in the casing to engage the lever at different points in its length, and a control arm in the casing connected to the fulcrum member to move it.

12. For use with a tractor having clutch and brake operating members, coupling means comprising a head mounted on the tractor for movement lengthwise thereof, means carried by the head to connect it to a ground engaging implement, an actuating member engageable with the clutch and brake operating members, a spring urging the actuating member in a direction to disengage the clutch and engage the brake, a latch to hold the actuating member against the spring, fluid pressure responsive means to hold the latch engaged, and a valve controlled by movement of the head in response to excessive draft on the implement to vent the pressure responsive means whereby the latch will be released.

HUBERT M. CLARK.

REFERENCES CITED

The following references are of record in the file of this patent:

UNITED STATES PATENTS

| Number | Name | Date |
|---|---|---|
| 610,250 | Thunderbolt | Sept. 6, 1898 |
| 2,151,207 | Hilde | Mar. 21, 1939 |
| 2,356,231 | Ferguson | Aug. 22, 1944 |
| 2,394,210 | Sherman | Feb. 5, 1946 |